Sept. 19, 1939.   J. DE R. KIELLAND   2,173,420
NUT LOCKING ARRANGEMENT
Filed April 16, 1938
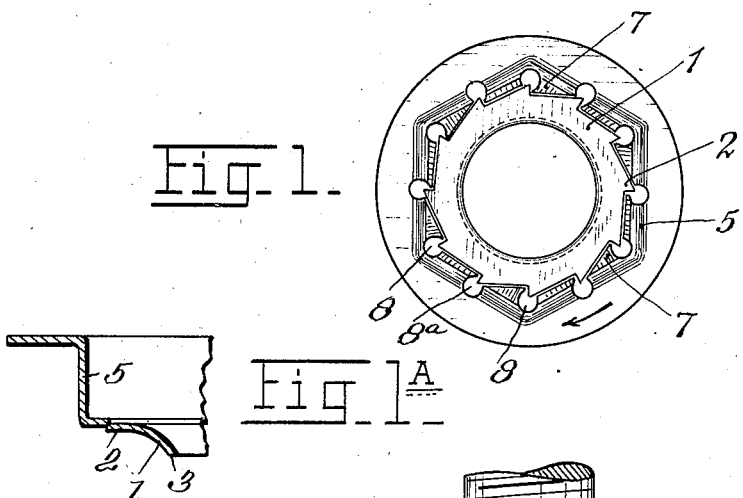
Fig. 1.
Fig. 1A.
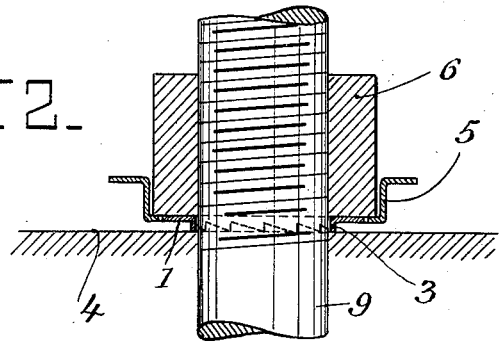
Fig. 2.
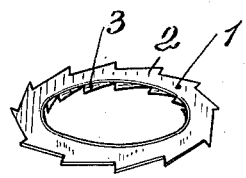
Fig. 3.
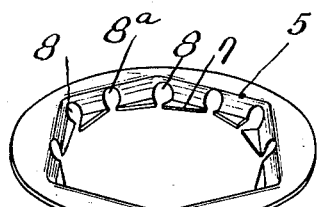
Fig. 4.
INVENTOR
J. de Rytter Kielland
By E. F. Wenderoth
ATTORNEY Patented Sept. 19, 1939

2,173,420

UNITED STATES PATENT OFFICE 2,173,420

NUT-LOCKING ARRANGEMENT

Jakob de Rytter Kielland, Oslo, Norway

Application April 16, 1938, Serial No. 202,561

2 Claims. (Cl. 151—41)

The present invention relates to a locking arrangement for a threaded nut, the characteristic feature of which arrangement resides in the fact that it comprises two cooperating members, one member forming a washer provided with teeth extending downwardly, and the other member forming a ring adapted to embrace the lower outer edge of the nut in such a manner that the ring cannot turn relatively to the nut. At the outer periphery of the first member and at the inner edge of the second member, resilient ratchet teeth are provided which engage one another so that the member connected to the nut can turn relatively to the other member when the nut is tightened, due to the resiliency of the ratchet teeth. However, the ratchet teeth prevent turning of the members relatively to one another when the nut tends to loosen so that the loosening of the nut is only possible by turning the first member relatively to the base.

The drawing illustrates an embodiment of the invention.

Figure 1 shows a plan view of the locking arrangement comprising two members;

Figure 1a is a fragmentary sectional view of the two members of Fig. 1 showing a modification according to which said two members are interconnected;

Figure 2 is an axial section through the nut and locking arrangement of Fig. 1, applied to a nut; and Figures 3 and 4 are perspective views of both members of the locking arrangement of Fig. 1.

The locking arrangement comprises the ring-like washer 1 provided at its outer edge with outwardly extending ratchet teeth 2 and at its inner edge with downwardly extending ratchet teeth 3. The teeth 3 are adapted to engage the base 4 (see Fig. 2) against which the nut is adapted to be tightened. The second member of the locking arrangement is the ring 5 whereof the outer portion embraces the lateral surfaces of nut 6 so that the ring cannot turn relatively to the nut.

At its inner edge, the ring 5 is provided with resilient teeth 7 positioned adjacent the lower side of the nut and adapted to engage the ratchet teeth 2 of washer 1.

The ring 5 is also shown as provided with slots or openings 8, 8a between the resilient teeth 7. These slots or openings increase the resiliency of the teeth and, in addition, the openings 8 being at the corners of the nut-receiving recess of the ring, simplify the forming of the ring. Although I have shown openings 8a intermediate the corners as well as openings 8 at the corners, the intermediate openings 8a can be omitted if desired.

When the nut 6 is screwed upon a bolt 9 in the direction shown by the arrow in Figure 1 then if the ring 5 embraces the lower end of the nut and the ring-like washer 1 is not in contact with the base 4 the ring 5 and the washer 1 will rotate as a unit since no resistance is interposed with respect to the rotation of the washer 1 and the resilient teeth 7 coacting with the teeth 2 will carry the washer 1 with the ring 5. However, when the washer 1 comes into contact with the base 4 the teeth 3 will impinge against such base and sufficient resistance will be set up so as to prevent rotation of the washer 1. Thereupon the flexible teeth 7 upon the ring 5 will snap over the ratchet teeth 2 as the nut is tightened and the ratchet teeth 3 upon continued turning of the nut 6 will be forced into the base 4 in a direction substantially parallel to the axis of the bolt.

The members 1 and 5 may be formed from a single blank and in the forming operation it is preferred not to stamp out the inner member 1 completely from the outer member 5 as shown in Fig. 1a. In other words, the action of the stamp is stopped while there is still a thin web of metal connecting the teeth 2 and 7. In this way the complete locking arrangement of the invention may be handled and applied to a nut as a unit, the aforesaid thin web of material being broken automatically as the nut is tightened. It will be understood that the thin web of connecting metal, may be provided along the length of each pair of complemental ratchet teeth or this connecting web may be provided at circumferentially spaced points only.

When the nut has been tightened, reverse turning of the nut is prevented through the engagement of teeth 7 and ratchet teeth 2 so that loosening of the nut can only occur by turning of the washer 1 relatively to the base, which turning is prevented by the teeth 3.

An important advantage of the present locking arrangement resides in the fact that the ratchet teeth 3 engaging the base are not moved relatively to the base when the nut is tightened. Consequently, during tightening, the teeth 3 are prevented from cutting a groove in the base, which groove would diminish the securing effect.

Having thus described my invention what I claim is:

1. A locking arrangement for a threaded nut comprising an annular member, means on said member for holding it stationary on a base, ratchet teeth on said member extending transversely of the axis of said nut, a second annular member, means on said second member to prevent rotation thereof relatively to said nut, ratchet teeth on said second member cooperating with said first named ratchet teeth and having their cooperating surfaces disposed in the same plane as said first named ratchet teeth, and frangible connections between said first and second named ratchet teeth designed to be broken upon tightening of the nut.

2. A locking arrangement for a threaded nut comprising an annular plate, means on said plate designed to cooperate with the substructure to prevent relative rotation, means on said plate to prevent relative movement between a nut and said plate, ratchet teeth provided on said plate between the inner and outer peripheries, flexible teeth designed to cooperate with said ratchet teeth also provided on said plate and frangible connections between said ratchet teeth and said flexible teeth designed to be broken upon tightening of the nut so as to permit relative movement between said ratchet teeth and said flexible teeth in one direction.

JAKOB DE RYTTER KIELLAND.